(12) United States Patent
Delisle

(10) Patent No.: US 6,780,263 B2
(45) Date of Patent: Aug. 24, 2004

(54) SEALER WITH CONTINUOUS MOTION ULTRASONIC ZIPPER WELDING

(75) Inventor: Victor Delisle, Roswell, GA (US)

(73) Assignee: Illinois Tool Works Inc., Glenview, IL (US)

(*) Notice: Subject to any disclaimer, the term of this patent is extended or adjusted under 35 U.S.C. 154(b) by 33 days.

(21) Appl. No.: 10/216,252

(22) Filed: Aug. 9, 2002

(65) Prior Publication Data
US 2004/0026008 A1 Feb. 12, 2004

(51) Int. Cl.[7] .............................................. B29C 65/08
(52) U.S. Cl. ..................... 156/64; 156/73.1; 156/290; 156/359; 156/361; 156/580.1; 156/580.2
(58) Field of Search .................... 156/64, 73.1, 290, 156/350, 359, 361, 378, 580.1, 580.2

(56) References Cited

U.S. PATENT DOCUMENTS

| | | | |
|---|---|---|---|
| 4,402,115 A | 9/1983 | Moertel | 24/205.16 R |
| 5,707,470 A | 1/1998 | Rajala et al. | 156/73.2 |
| 5,711,847 A | 1/1998 | Rajala et al. | 156/580.2 |
| 5,919,539 A | 7/1999 | Bisbis et al. | 428/57 |
| 6,022,443 A | 2/2000 | Rajala et al. | 156/302 |
| 6,291,039 B1 | 9/2001 | Combe et al. | 428/35.2 |
| 6,517,650 B2 * | 2/2003 | Couillard et al. | 156/73.1 |
| 6,517,671 B2 * | 2/2003 | Couillard et al. | 156/580.2 |
| 6,537,401 B2 * | 3/2003 | Couillard et al. | 156/64 |
| 6,540,854 B2 * | 4/2003 | Couillard et al. | 156/64 |
| 6,547,903 B1 | 4/2003 | McNichols et al. | 156/64 |

FOREIGN PATENT DOCUMENTS

| | | |
|---|---|---|
| FR | 2787058 | 6/2000 |
| WO | WO 98/08739 | 3/1998 |
| WO | WOX 98/49062 | 11/1998 |

OTHER PUBLICATIONS

U.S. patent application Ser. No. 2002/0062902 A1, filed May 30, 2002.
U.S. patent application Ser. No. 2003/0093971 A1, filed May 22, 2003.

* cited by examiner

Primary Examiner—James Sells
(74) Attorney, Agent, or Firm—Ostrager Chong Flaherty & Broitman P.C.

(57) ABSTRACT

A method and an apparatus for producing zippered bags at faster speeds. This is accomplished by speeding up the ultrasonic welding operation. More specifically, ultrasonic welding is performed continuously while the web of bag making film and the zipper tape are moving, instead of being performed while the film and zipper tape are stopped. To facilitate this improvement, the ultrasonic welding station is moved from the bag machine, where the bag making film and zipper tape move intermittently, to the sealer frame, where the film and zipper tape move continuously. The ultrasonic welding apparatus comprises a pair of rotary elements, one of which is acoustically coupled to an ultrasonic transducer. One of the rotary elements is provided with a protuberance on its periphery that acoustically couples the zipper tape to the energized rotary element.

31 Claims, 3 Drawing Sheets

SEALER WITH CONTINUOUS MOTION ULTRASONIC ZIPPER WELDING

BACKGROUND OF THE INVENTION

This invention generally relates to methods and apparatus for manufacturing plastic zippered bags of the type in which material, such as foodstuff and detergent, are stored.

Reclosable bags are finding ever-growing acceptance as primary packaging, particularly as packaging for foodstuffs such as cereal, fresh vegetables, snacks and the like. Such bags provide the consumer with the ability to readily store, in a closed, if not sealed, package any unused portion of the packaged product even after the package is initially opened.

Reclosable plastic zipper assemblies are useful for sealing thermoplastic pouches or bags. Typically, the plastic zippers include a pair of interlockable profiled members that form a closure. As the slider moves across the closure members, the profiles are opened or closed. The profiles in plastic zippers can take on various configurations, e.g. interlocking rib and groove elements having so-called male and female profiles, interlocking alternating hook-shaped closure elements, etc.

Machinery for continuously manufacturing zippered bags at high speed is well known. A typical pre-made bag system comprises a station for continuously paying out a web of bag making film from a roll; a folding mechanism for folding the film; a station for continuously paying out a zipper tape and inserting the tape between the opposing walls of the folded bag making film in the machine direction; a station for continuously conduction heat sealing the zipper tape to both walls of the bag making film; a station for ultrasonically welding the zipper at regular package width intervals; a station for cross sealing (again using heat conduction) the zipper/film assembly at the same regular package width intervals to form side seals; and a station for cutting the zipper/film assembly along a midline of the zipper crush and the cross seal to sever a bag from the remainder of the film. In a known pre-made bag system, the film moves continuously through the zipper sealing station, but intermittently through the ultrasonic welding, cross sealing and cutting stations. This transition is effectuated by a synchronization section having motor-driven pinch rolls and a dancer that converts continuous motion into start-stop motion.

Known pre-made bag systems of the above-described type can produce bags at a rate of 200 bags per minute. It would be desirable to increase the production rate of such pre-made bag systems. The limiting factor in speed is the time required to perform an ultrasonic crush of the zipper tape. Thus there is a need for an apparatus for ultrasonically welding the zipper that can operate at faster speeds.

BRIEF DESCRIPTION OF THE INVENTION

The invention is directed to a method and an apparatus for producing zippered bags at faster speeds. This is accomplished by speeding up the ultrasonic welding operation. More specifically, ultrasonic welding is performed continuously while the web of bag making film and the zipper tape are moving, instead of being performed while the film and zipper tape are stopped. To facilitate this improvement, the ultrasonic welding station is moved from the bag machine, where the bag making film and zipper tape move intermittently, to the sealer frame, where the film and zipper tape move continuously.

One aspect of the invention is a method comprising the following steps: continuously moving a thermoplastic zipper tape along a path; and ultrasonically welding the zipper tape at successive spaced zones along its length at a rate of welding while the zipper tape is moving along the path.

Another aspect of the invention is a method comprising the following steps: incrementally inserting a thermoplastic zipper tape between opposing edges of a folded web of thermoplastic bag making film; continuously moving the folded web and the inserted zipper tape together along a path; incrementally sealing the inserted zipper tape to the folded web of bag making film in a lengthwise direction of the zipper tape while the zipper tape and the web of bag making film are moving together, the incremental sealing occurring along a first segment of the path; and ultrasonically welding the zipper tape and adjoining web portions at successive spaced zones while the zipper tape and the web of bag making film are moving together, the ultrasonic welding occurring along a second segment of the path spaced apart from the first segment.

A further aspect of the invention is an apparatus comprising: a welding station comprising first and second rotary elements arranged with mutually parallel axes of rotation, the first and second rotary elements comprising respective peripheries that are in mutual opposition at a gap; a transducer for converting electric potential differences into ultrasound wave energy, the first rotary element being acoustically coupled to the transducer; drive means for causing the first and second rotary elements to rotate in opposite directions; means for continuously moving a thermoplastic zipper tape along a path that passes through the gap between the first and second rotary elements; and means for acoustically coupling acoustic wave energy from the first rotary element into the zipper tape at spaced intervals along the zipper tape.

Another aspect of the invention is an apparatus for continuously sealing a thermoplastic zipper tape inside opposing edges of a folded web of thermoplastic bag making film. The apparatus comprises: a first pair of mutually opposing sealing bars for incrementally sealing the zipper tape to the folded web of bag making film in a lengthwise direction of the zipper tape while the zipper tape and the folded web are moving together; and rotary ultrasonic apparatus for ultrasonically welding the zipper tape and adjoining portions of the folded web at successive spaced zones along the zipper tape at a rate of welding while the sealed zipper tape/web assembly is moving.

Yet another aspect of the invention is an apparatus comprising: means for continuously moving a web of thermoplastic bag making film and a thermoplastic zipper tape together in adjoining relationship; a stationary conduction heat sealer arranged to continuously seal the zipper tape to the web of bag making film while the zipper tape and the web are moving; first and second rotary elements arranged with mutually parallel axes of rotation and with peripheral surfaces separated by a gap through which the zipper tape and adjoining portions of the web pass, the first rotary element comprising a protuberance on its periphery, the protuberance passing through the gap during rotation of the first rotary element; and an ultrasonic transducer for converting electrical energy into ultrasonic wave energy, wherein the ultrasonic transducer is acoustically coupled to one of the first and second rotary elements.

Other aspects of the invention are disclosed and claimed below.

DETAILED DESCRIPTION OF THE INVENTION

Figure 1:
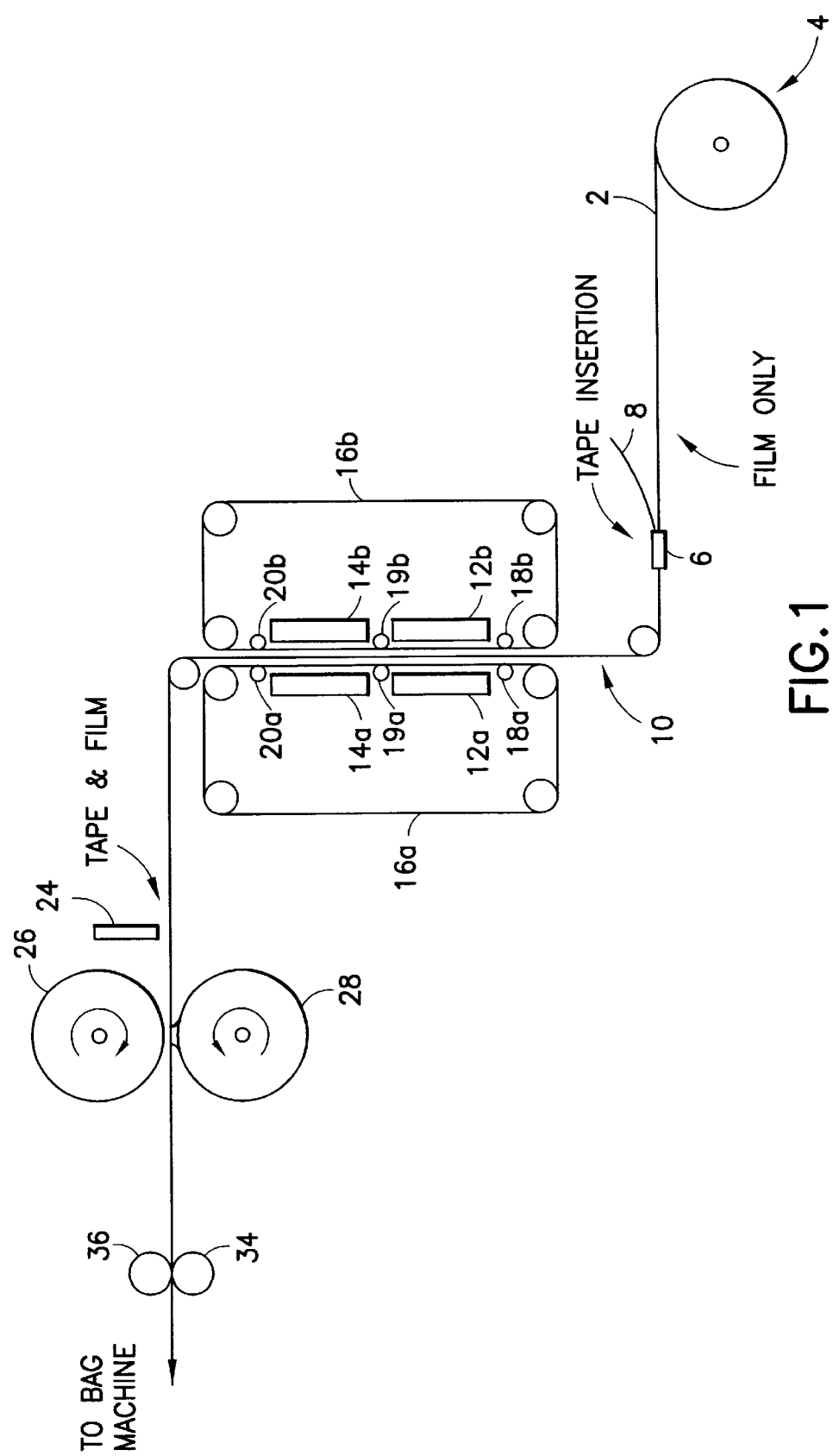
FIG. 1 is a drawing showing a side view of a continuous sealing machine having apparatus for continuous ultrasonic welding of zipper tape in accordance with one embodiment of the invention.
Figure 2:
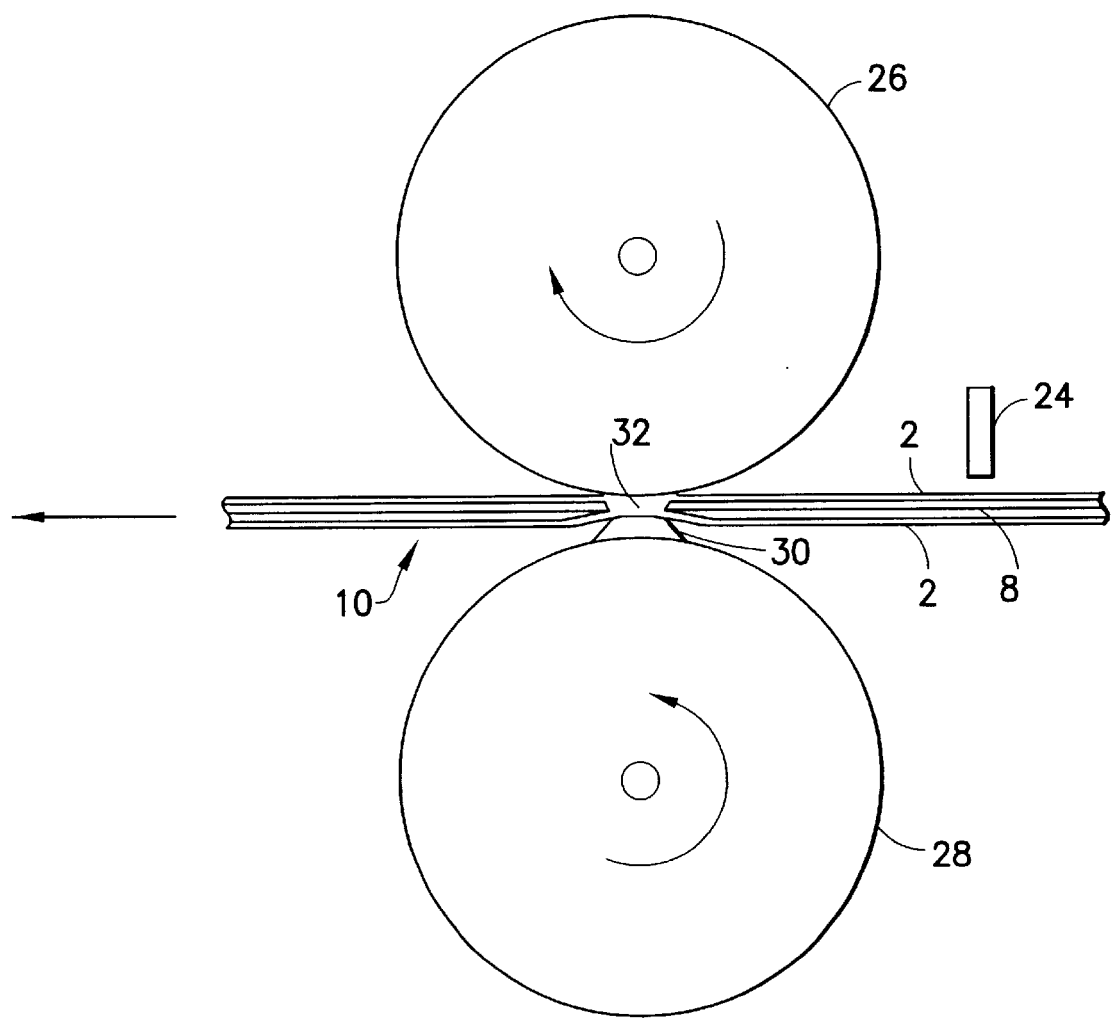
FIG. 2 is a drawing showing, on an enlarged scale, the rotary elements for ultrasonic welding incorporated in the sealing machine depicted in FIG. 1.

The method and apparatus of the present invention will now be described with reference to FIGS. 1 and 2. FIG. 1 shows a zipper tape-to-film sealing apparatus that works in conjunction with a bag making machine. In particular, the sealing apparatus disclosed herein can be used in conjunction with a pre-made bag machine, i.e., a machine that makes bags but does not fill them.

Referring to FIG. 1, pre-folded web 2 of bag making film is paid out from a roll 4 and a zipper tape 8 is inserted between the walls of the folded web by a tape inserter 6. The zipper tape and folded web are then threaded through a sealing station (12a,b, 14a,b), an ultrasonic welding station (26, 28), and a pair of motor-driven pinch rolls 34 and 36. Typically the pinch rolls 34 and 36, which pull the film 2 through the sealing and ultrasonic welding stations, are part of the bag making machine. As an alternative to paying out a pre-folded web 2 of bag making film, film that is not folded can be wound on roll 4. In this case, a conventional folding board or plow would be installed between the roll 4 and the tape inserter 6.

The zipper tape is unwound from a spool (not shown) and guided into position by the tape inserter 6, which comprises a channel having a cross-sectional profile shaped to maintain the orientation of the zipper tape 8 as it is fed toward the folded web 2. The outlet end of the tape inserter 6 is designed to separate the opposing edges of the folded web by a sufficient distance to allow the emerging zipper tape 8 to be inserted therebetween and in parallel with the opposing edges. Sets of opposing guide rollers may be provided at any points downstream of the tape inserter to maintain the position of the inserted zipper tape 8 in parallel with and sandwiched between the opposing walls of the folded web 4.

The folded web 2 and the zipper tape 8 are then advanced together through the vertical sealing apparatus comprising a first pair of opposing heated sealing bars 12a and 12b and a second pair of opposing heated sealing bars 14a and 14b. The sealing bars 12a and 14a are laterally displaceable, as are the sealing bars 14a and 14b, between respective extended and retracted positions. Sealing of the zipper tape to the folded web of bag making film occurs while the sealing bars are in their respective extended positions. The sealing bars are retracted as needed, e.g., during threading of the web and tape through the sealing apparatus prior to startup.

Although not shown in FIG. 1, each sealing bar may be mounted to a laterally displaceable seal bar mounting plate via a pair of threaded rods, while the seal bar mounting plate is in turn fastened to the ends of a pair of guide shafts respectively supported by a pair of flanged mount bearings. The flanged mount bearings sit atop and are fastened to a cylinder mounting plate. The force for displacing the sealing bar is provided by an air cylinder having a piston, the end of which is fastened to the middle of the seal bar mounting plate.

As the folded web 2 with inserted zipper tape 8 advances vertically and continuously between the opposing sets of sealing bars, the respective zipper flanges of the zipper tape are sealed to the opposing edges of the bag making film, thereby continuously attaching incoming sections of the moving zipper tape to adjoining sections of the moving web. The sealing is accomplished by electrically heating the sealing bars, the heat being conducted through respective endless barrier strips 16a and 16b made of Teflon or similar material, which circulate on respective sets of rollers. Teflon barrier strip 16a passes between one side of the folded web and the sealing bars 12a and 14a, while Teflon barrier strip 16b passes between the other side of the folded web and the sealing bars 12b and 14b. In the gaps between the opposing sealing bars, the web and zipper tape are sandwiched between and held together by the Teflon barrier strips 16a and 16b, which move with the web and zipper tape and prevent the bag making film from sticking against the stationary heated sealing bars during conduction heat sealing. The Teflon barrier strips and intervening web and zipper tape pass through the nips of a series of guide rollers respectively positioned in advance of the sealing bars (guide rollers 18a and 18b); in between the sealing bars (guide rollers 19a and 19b); and after the sealing bars (guide rollers 20a and 20b). It should be appreciated that for the sake of illustration, the Teflon barrier strips, the folded web and the sealing bars are shown in FIG. 1 with respective gaps between adjoining components, whereas in reality these components are in contact with each other when the sealing bars are in their extended positions. Likewise the nips formed by the opposing pairs of guide rollers have been shown in the drawing with gaps, when in actuality the Teflon barrier strips and the web with inserted zipper tape are pressed together in the nips and no gaps occur.

In one implementation, each sealing bar is about 6 inches long and the Teflon barrier strips are about 1.5 inches wide. Both the Teflon barrier strips 16a and 16b and the guide rollers 18a, 18b, 19a, 19b, 20a and 20b are disposed in the area of the zipper tape and do not extend the full height (i.e., the dimension transverse to the zipper tape) of the folded bag making film.

Although the embodiment shown in FIG. 1 has two sealing bars arranged in series on each side of the traveling web and zipper tape, any number of sealing bars can be used provided that sufficient heat is conducted into the zipper tape to cause the zipper flanges to seal to the bag making film.

Typically each sealing bar assembly comprises a seal bar core, a seal bar cap having a sealing bar projecting therefrom, an insulator, and another seal bar cap separated from the seal bar core by the insulator. The seal bar cap is fastened to the ends of the previously mentioned threaded rods. The seal bar core has a pair of longitudinal channels that respectively house a thermocouple and an electric heater (neither of which are shown in the drawings), both of which are electrically connected to a programmable heat controller (not shown) by electrical wiring (not shown). The thermocouple produces electrical signals representing the temperature of the seal bar core, which signals are received by the heat controller. The heat controller controls the level of electrical current supplied to the heater in accordance with a heat control program that is designed to maintain the sealing bar temperature within limits preset by the system operator. In particular, the temperature of the sealing bar must be selected such that the amount of heat conducted through the bag making film and into the adjoining zipper flange, during the time that the zipper flanges and film are pressed between the extended sealing bars, will achieve the desired result, namely, sealing of the zipper flange to the bag making film without "seal-through" of the zipper flanges, i.e., sealing of the zipper flanges to each other. The zipper flanges may be laminated with high-melting-point thermoplastic material on their confronting sides to prevent "seal-through" of the zipper flanges.

The zipper tape and folded web that enter the sealing station unjoined, exit the sealing station joined together by permanent seals. The pinch rolls 34 and 36 (which form part of the bag making machine) continue to pull the joined zipper tape and web forward. On the way to the bag making machine, the joined zipper tape/film assembly pass through a rotary ultrasonic apparatus comprising a horn 26 and an anvil 28, which are shown on a larger scale in FIG. 2. Either both the horn and the anvil rotate, or one rotates while the other does not rotate. In the disclosed embodiment, both the horn and the anvil are rotated. A photodetector 24 positioned in the vicinity of the rotary ultrasonic apparatus receives radiant energy that has been transmitted by a light source (not shown) and reflected off an opposing portion of the moving web of film. The web of film is marked at regular spaced intervals in the zone where the radiant energy from the light source impinges. The marks absorb the transmitted radiant energy, producing a distinctive electrical signal in the photodetector 24 each instant when a mark passes by. The time intervals between the detection signals corresponding to equally spaced marks on the film are a function of the speed of the film. Thus, the output of detection signals from the photodetector 24 to a programmable controller (42 in FIG. 3) allows the latter to control the rotation of the rotary elements 26 and 28 so that the peripheries of each rotary element have a tangential velocity component, during the welding portion of the work cycle, that is approximately equal to the linear speed of the moving zipper tape/web assembly. A person skilled in the art will appreciate that other detection means could be employed instead of a photo-optical eye to detect the speed of the moving film. For example, an encoder wheel that produces a number of signals or pulses every revolution may be placed so that its periphery engages the moving web of film and rotates due to the frictional force exerted by the moving film. The photo eye, in concert with the encoder, can be used to correctly place the crush on the zippered film.

In the disclosed embodiment, rotary element 26 is a horn acoustically coupled to an ultrasonic transducer and rotary element 28 is an anvil. The rotary ultrasonic apparatus is mounted on a movable frame (not shown) in order to register the weld or crush in the correct position on the zipper tape/bag film assembly. As best seen in FIG. 2, the rotary anvil 28 comprises a protuberance or land 30 that projects radially outward from a circular cylindrical peripheral surface. A weld 32 is made on the zipper tape each time the protuberance 30 passes through the gap between the rotating horn and anvil and presses the zipper tape, provided that the horn 26 is energized. The zipper tape and adjoining portions of the web are pressed between the protuberance 30 and the energized horn 26, thereby acoustically coupling the thermoplastic material of the zipper tape and film to the circular cylindrical peripheral surface of the horn. The amplitude of the acoustic wave energy is adequate to cause thermoplastic material to soften or melt at the interface of the zipper flange and the bag film, thereby forming a permanent seal when the fused material is cooled. When the protuberance 30 is not in the gap between the horn and the anvil, there is sufficient clearance for the zipper tape and folded web to pass through the gap without matching the speed of the moving tape/web assembly.

Although the protuberance is on the rotary anvil in the disclosed embodiment, alternatively the protuberance could be located on the rotary horn instead. In either arrangement, the protuberance pressing the zipper tape and film in the nip of the rotary ultrasonic apparatus establishes the acoustic coupling of the thermoplastic material of zipper and film to the energized horn. Moreover, instead of a single protuberance, two or more protuberances spaced at equal angles on the periphery of either of the rotary elements can be provided.

Female knurls may be formed on the contacting surface of the protuberance 30 (see FIG. 2) to provide grooves for the thermoplastic material to flow into during welding, rather than being squeezed out the sides. The rotary horn 26 may also be provided with female knurls around its circumference.

In one embodiment, the rotary horn and the rotary anvil can both be rotated continuously to effect welding at spaced intervals along the length of the continuously moving zipper tape. In the case of a single protuberance, the middles of the welds will be spaced at intervals approximately equal to the circumference of the rotary element that carries the protuberance.

Figure 3:
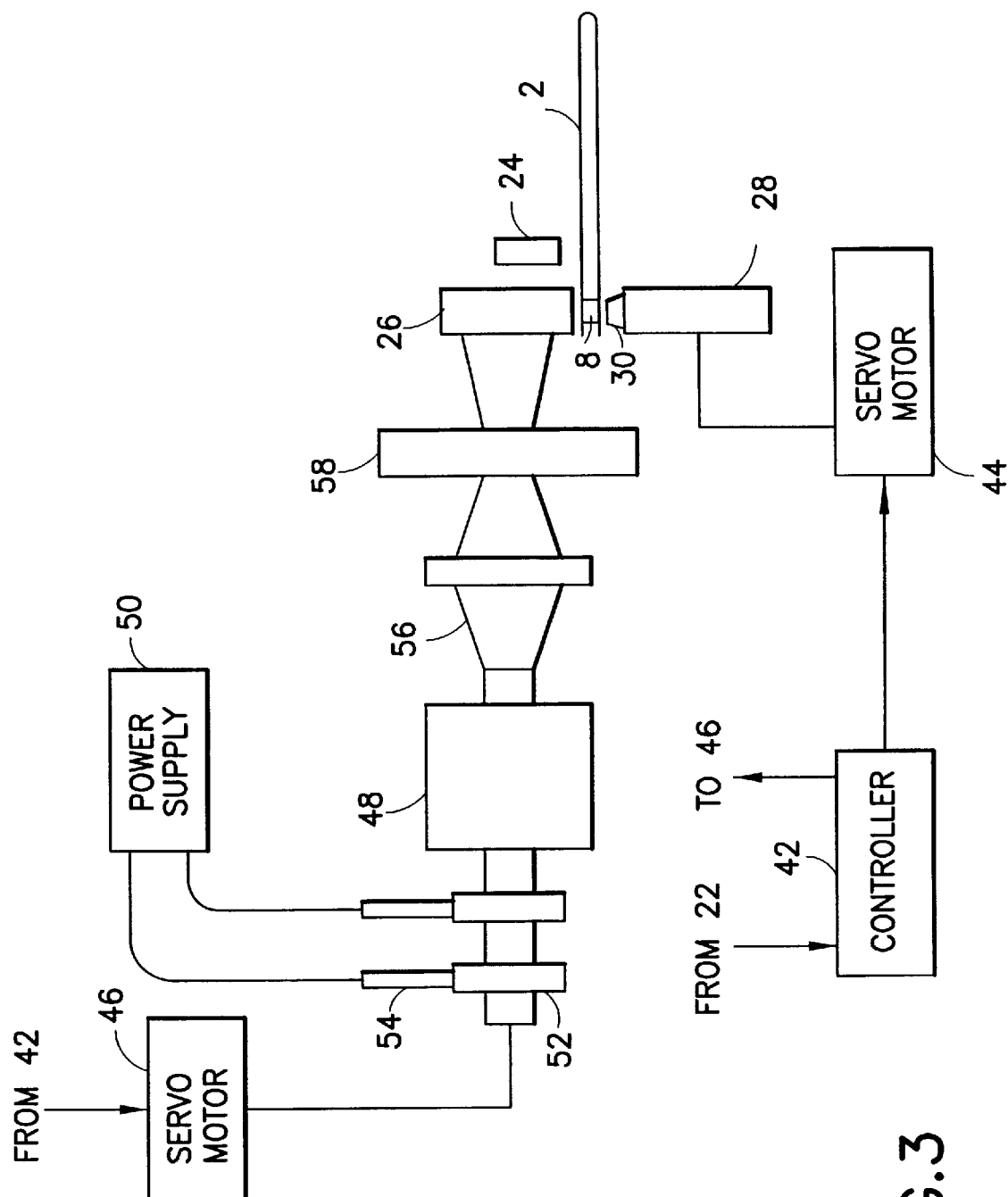
FIG. 3 is a block diagram depicting additional components of the rotary ultrasonic welding apparatus in accordance with the embodiment depicted in FIG. 2.

In accordance with the embodiment depicted in FIG. 3, the rotary elements 26 and 28 are driven to rotate by respective servomotors 46 and 44. These servomotors are controlled by a programmable controller 42 so that rotation of the driven rotary elements follows the speed of the film, i.e., the controller issues control signals to the servomotors that are a function of the film speed indicating signals received from the photodetector 24 (or other film speed detecting device). Preferably the rotary element that carries the acoustic coupling protuberance 30 (anvil 28 in the embodiment shown in FIG. 3) comes to rest during each work cycle and does not move until the controller 42 receives a trigger signal from the photodetector 24. The rotary element that does not carry the protuberance 30 (horn 26 in FIG. 3) may be moving continuously or may comes to rest during each work cycle and not move until the controller 42 receives the aforementioned trigger signal from the photodetector 24. In either case, the servomotors 44 and 46 are controlled by the controller 42. In the case where both rotary elements come to rest during each work cycle and do not move until the trigger signal is received from the photodetector, optionally the rotary elements can be driven by a single servomotor by coupling the driven rotary element to the other rotary element by means of a drive belt.

Still referring to FIG. 3, the horn 26 forms part of a radial actuator that further comprises an ultrasonic transducer 48 that converts electrical energy provided by a power supply 50 into ultrasonic wave energy. Slip rings 52 connected to the ultrasonic mechanism are engaged by brushes 54 to provide electrical power to the transducer. The ultrasonic wave energy produced by transducer 48 is amplified by a booster 56 before passing to the horn 26. The horn 26 can rotate in the adjustable bracket 58 while mechanically vibrating at a desired ultrasonic amplitude. Ultrasonic vibration in the horn 26 is emitted in a radial direction through the circumference of the horn 26 to the thermoplastic material pressed against the circumference. Because the horn can roll tangentially with the thermoplastic material, drag and puckering effects are eliminated.

After ultrasonic welding, the sealed and ultrasonically welded tape/film assembly travels to a pre-made bag machine (not shown). The tape/film assembly moves intermittently through cross sealing and cutting stations of the bag machine. The transition from continuous motion in the sealing machine to intermittent motion in the bag machine is effectuated by a synchronization section having motor-driven pinch rolls 34 and 36 (see FIG. 1) and a dancer (not shown) that converts continuous motion into start-stop motion. In addition to the above, optionally the synchronization section has some device to further reduce the thickness of the welded material to facilitate the subsequent cutting operation using a hot knife. The thickness of the weld exiting the ultrasonic welding apparatus will equal the distance from protuberance 30 (see FIG. 2) to the horn circumference.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A method comprising the following steps:
   (a) continuously moving a thermoplastic zipper tape along a path; and
   (b) ultrasonically welding said zipper tape at successive spaced zones along its length at a rate of welding while said zipper tape is moving, said ultrasonic welding occurring in a first space along said path.

2. The method as recited in claim 1, wherein said zipper tape passes through a gap separating first and second rotary elements, further comprising the step of energizing one of said rotary elements with ultrasonic wave energy.

3. The method as recited in claim 2, further comprising the steps of causing said first and second rotary elements to rotate in opposite directions at respective rotational speeds during a welding portion of each work cycle such that their respective peripheries have respective tangential velocity components approximately equal to the speed at which said zipper tape passes through said gap.

4. The method as recited in claim 3, further comprising the steps of causing said first rotary element to rotate during a non-welding portion of said work cycle at rotational speeds less than its rotational speed during said welding portion of said work cycle, and causing said second rotary element to rotate during a non-welding portion of said work cycle at a rotational speed substantially equal to its rotational speed during said welding portion of said work cycle.

5. The method as recited in claim 4, further comprising the step of causing said first rotary element to come to rest during said non-welding portion of said work cycle.

6. The method as recited in claim 1, wherein said path of said zipper tape also passes through a second station, the method further comprising the following steps:
   (c) continuously moving a web of thermoplastic bag making film along said path; and
   (d) incrementally sealing said zipper tape to said web of bag making film in a lengthwise direction of said zipper tape while said zipper tape and said web of bag making film are moving, said incremental sealing occurring in a second space along said path, wherein said first and second spaces have no space in common.

7. The method as recited in claim 6, further comprising detecting the speed of said continuously moving web of bag making film and controlling the rate of welding as a function of the detected speed.

8. The method as recited in claim 6, wherein said sealing step comprises conduction heat sealing.

9. The method as recited in claim 6, further comprising the steps of folding said web of bag making film as it moves and inserting said zipper tape between opposing portions of said folded web, said zipper tape being sealed to said opposing portions of said web of bag making film during step (d).

10. A method comprising the following steps:
    incrementally inserting a thermoplastic zipper tape between opposing edges of a folded web of thermoplastic bag making film;
    continuously moving said folded web and said inserted zipper tape together along a path;
    incrementally sealing said inserted zipper tape to said folded web of bag making film in a lengthwise direction of said zipper tape while said zipper tape and said web of bag making film are moving together, said incremental sealing occurring along a first segment of said path; and
    ultrasonically welding said zipper tape and adjoining web portions at successive spaced zones while said zipper tape and said web of bag making film are moving together, said ultrasonic welding occurring along a second segment of said path,
    wherein said first and second segments of said path are spaced apart.

11. The method as recited in claim 10, further comprising detecting the speed of said continuously moving web of bag making film and controlling the rate of ultrasonic welding as a function of the detected speed.

12. The method as recited in claim 10, wherein said sealing step comprises conduction heat sealing.

13. An apparatus comprising:
    a welding station comprising first and second rotary elements arranged with mutually parallel axes of rotation, said first and second rotary elements comprising respective peripheries that are in mutual opposition at a gap;
    a transducer for converting electric potential differences into ultrasound wave energy, said first rotary element being acoustically coupled to said transducer;
    drive means for causing said first and second rotary elements to rotate in opposite directions;
    means for continuously moving a thermoplastic zipper tape along a path that passes through said gap between said first and second rotary elements; and
    means for acoustically coupling acoustic wave energy from said first rotary element into said zipper tape at spaced intervals along said zipper tape.

14. The apparatus as recited in claim 13, wherein said acoustic coupling means comprise a protuberance on the periphery of one of said first and second rotary elements, a weld being made on said zipper tape each time said protuberance engages said zipper tape during rotation of said first and second rotary elements while said first rotary element is energized.

15. The apparatus as recited in claim 14, wherein said drive means comprise a servomotor for driving said rotary element having said protuberance to rotate, further comprising a detector arranged to produce a signal indicating the speed of said continuously moving web of bag making film and a controller for controlling said servomotor to drive said rotary element having said protuberance to rotate with a tangential velocity component approximately equal to said detected web speed in a phase of rotation when said protuberance is in contact with said moving web.

16. The apparatus as recited in claim 15, wherein said detector comprises a photodetector arranged to receive radiant energy reflected from said web.

17. The apparatus as recited in claim 15, wherein said detector comprises an encoder wheel having a periphery in contact with said web.

18. The apparatus as recited in claim 13, further comprising a controller for controlling said drive means to rotate said first and second rotary elements in opposite directions at respective rotational speeds during a welding portion of each work cycle such that the peripheries of said first and second rotary elements have respective tangential velocity components approximately equal to the speed at which said zipper tape is moving.

19. The apparatus as recited in claim 13, further comprising:
   means for inserting said zipper tape between opposing edges of a folded web of thermoplastic bag making film, said continuous movement means thereafter continuously moving said zipper tape and said web together;
   a sealing station comprising first and second sealing bars arranged in mutual opposition with a gap therebetween, said continuously moving zipper tape and adjoining portions of said web passing through said gap between said first and second sealing bars; and
   a heat controller for controlling the temperatures at the surfaces of said first and second sealing bars.

20. An apparatus for continuously sealing a thermoplastic zipper tape inside opposing edges of a folded web of thermoplastic bag making film, comprising:
   a first pair of mutually opposing sealing bars for incrementally sealing said zipper tape to said folded web of bag making film in a lengthwise direction of said zipper tape while said zipper tape and said folded web are moving together; and
   rotary ultrasonic apparatus for ultrasonically welding said zipper tape and adjoining portions of said folded web at successive spaced zones along said zipper tape at a rate of welding while said sealed zipper tape/web assembly is moving.

21. The apparatus as recited in claim 20, wherein said rotary ultrasonic apparatus comprises first and second rotary elements separated by a gap, one of said rotary elements comprising a protuberance on its periphery, said zipper tape being acoustically coupled to said rotary ultrasonic apparatus only when said protuberance is disposed in said gap.

22. The apparatus as recited in claim 21, further comprising means for driving said first and second rotary elements to rotate in opposite directions at respective rotational speeds during a welding portion of each work cycle such that the peripheries of said first and second rotary elements have respective tangential velocity components approximately equal to the speed at which said sealed zipper tape/web assembly is moving.

23. The apparatus as recited in claim 22, wherein said driving means comprise a servomotor for driving said rotary element having said protuberance to rotate.

24. The apparatus as recited in claim 23, further comprising a detector arranged to produce a signal indicating the speed of said continuously moving web of bag making film and a controller for controlling said servomotor as a function of said signal.

25. An apparatus comprising:
   means for continuously moving a web of thermoplastic bag making film and a thermoplastic zipper tape together in adjoining relationship;
   a stationary conduction heat sealer arranged to continuously seal said zipper tape to said web of bag making film while said zipper tape and said web are moving;
   first and second rotary elements arranged with mutually parallel axes of rotation and with peripheral surfaces separated by a gap through which said zipper tape and adjoining portions of said web pass, said first rotary element comprising a protuberance on its periphery, said protuberance passing through said gap during rotation of said first rotary element; and
   an ultrasonic transducer for converting electrical energy into ultrasonic wave energy, wherein said ultrasonic transducer is acoustically coupled to one of said first and second rotary elements.

26. The apparatus as recited in claim 25, wherein said zipper tape is ultrasonically welded between said first and second rotary elements after said zipper tape has been sealed to said web.

27. An apparatus comprising:
   a welding station comprising first and second elements, said first element being rotatable and said second element being separated from said first element by a gap;
   a transducer for converting electric potential differences into ultrasound wave energy, one of said first and second elements being acoustically coupled to said transducer;
   drive means for causing said first element to rotate; and
   means for continuously moving a thermoplastic zipper tape along a path that passes through said gap between said first and second elements,
   wherein said rotatable first element comprises a peripheral structure that causes said moving zipper tape to be periodically pressed between said first and second elements at spaced intervals along said zipper tape, said transducer providing ultrasound wave energy to said one of said first and second elements acoustically coupled to said transducer during said periodic applications of pressure.

28. The apparatus as recited in claim 27, wherein said second element is rotatable.

29. The apparatus as recited in claim 27, wherein said peripheral structure comprises a protuberance, a weld being made on said zipper tape each time said protuberance engages said zipper tape during rotation of said first element and while said transducer is energized.

30. The apparatus as recited in claim 27, wherein said drive means comprise a servomotor for driving said first element to rotate with a tangential velocity component approximately equal to the speed of said zipper tape.

31. The apparatus as recited in claim 27, further comprising:
   means for inserting said zipper tape between opposing edges of a folded web of thermoplastic bag making film, said continuous movement means thereafter continuously moving said zipper tape and said web together;
   a sealing station comprising first and second sealing bars arranged in mutual opposition with a gap therebetween, said continuously moving zipper tape and adjoining portions of said web passing through said gap between said first and second sealing bars; and
   a heat controller for controlling the temperatures at the surfaces of said first and second sealing bars.

* * * * *

UNITED STATES PATENT AND TRADEMARK OFFICE
CERTIFICATE OF CORRECTION

PATENT NO. : 6,780,263 B2
DATED : August 24, 2004
INVENTOR(S) : Victor Delisle

It is certified that error appears in the above-identified patent and that said Letters Patent is hereby corrected as shown below:

<u>Title page,</u>
Item [56], References Cited, U.S. PATENT DOCUMENTS, insert patent numbers -- 5,110,403 and -- 6,406,468 -- as cited by the applicant.

Signed and Sealed this

Fifth Day of October, 2004

JON W. DUDAS
*Director of the United States Patent and Trademark Office*